US012773062B2

(12) United States Patent
Huiberts et al.

(10) Patent No.: US 12,773,062 B2
(45) Date of Patent: Oct. 27, 2026

(54) COFFEE DISPENSER SYSTEM

(71) Applicant: Bravilor Bonamat B.V., Heerhugowaard (NL)

(72) Inventors: Johannes Theodorus Emerentia Huiberts, Heerhugowaard (NL); Romanus Eduard Verhoeven, Heerhugowaard (NL)

(73) Assignee: Bravilor Bonamat B.V., Heerhugowaard (NL)

( * ) Notice: Subject to any disclaimer, the term of this patent is extended or adjusted under 35 U.S.C. 154(b) by 994 days.

(21) Appl. No.: 18/076,867

(22) Filed: Dec. 7, 2022

(65) Prior Publication Data

US 2023/0096262 A1 Mar. 30, 2023

Related U.S. Application Data

(63) Continuation of application No. PCT/NL2021/050379, filed on Jun. 17, 2021.

(30) Foreign Application Priority Data

Jun. 18, 2020 (NL) ..................................... 2025854

(51) Int. Cl.
*A47J 31/46* (2006.01)
*A47J 31/52* (2006.01)

(52) U.S. Cl.
CPC ........... *A47J 31/467* (2013.01); *A47J 31/525* (2018.08)

(58) Field of Classification Search
CPC ........ A47J 31/30; A47J 31/467; A47J 31/525; A23F 5/105; B01F 23/702; B01F 23/803
See application file for complete search history.

(56) References Cited

U.S. PATENT DOCUMENTS 3,031,947 A 5/1962 Curt
3,345,934 A 10/1967 Steiner et al.
3,634,107 A * 1/1972 Cornelius ............... A47J 31/40 99/275
2018/0110363 A1* 4/2018 Glucksman ......... A47J 31/4403
2018/0118551 A1* 5/2018 Jammes ............... B67D 1/1272
2021/0145207 A1* 5/2021 Ceotto .................. A47J 31/461

FOREIGN PATENT DOCUMENTS

EP 3298934 A1 3/2018
WO 2021256926 A1 12/2021

* cited by examiner

*Primary Examiner* — Justin C Dodson
*Assistant Examiner* — Spencer H. Kirkwood
(74) *Attorney, Agent, or Firm* — Peacock Law P.C.; Justin R. Muehlmeyer; Daniel J. Berenger-Russell

(57) ABSTRACT

A coffee dispenser system including a coffee brewer unit, a container and a coffee supply channel between the coffee brewer unit and the container to provide a fluid connection between the coffee brewer unit and the container for receiving and holding coffee from the coffee brewer unit, and an outlet channel for coffee which is connected to the container. The coffee supply channel and the outlet channel for coffee both connect to the container at a bottom side of the container. The coffee supply channel that connects to the container extends upwardly inside the container up to a highest level. At the highest level, an air relief chamber is provided to release air from the coffee transported through the coffee supply channel, and from the air relief chamber, a coffee mix channel extends downwardly to above and near to the bottom of the container.

7 Claims, 2 Drawing Sheets

COFFEE DISPENSER SYSTEM

CROSS-REFERENCE TO RELATED APPLICATIONS

This application is a continuation application of International Patent Application No. PCT/NL2021/050379, titled "A Coffee Dispenser System", filed on Jun. 17, 2021, which claims priority to and the benefit of Netherland Patent Application No. 2025854, titled "A Coffee Dispenser System", filed on Jun. 18, 2020, and the specification and claims thereof are incorporated herein by reference.

BACKGROUND OF THE INVENTION

Field of the Invention

The invention relates to a coffee dispenser system, comprising a coffee brewer unit and an outlet channel for coffee.

Background Art

A coffee dispenser system is described in Dutch patent application 202275, which is not yet published at the priority date. The coffee brewer unit comprises a vessel for receiving and mixing a powder material and hot liquid, a filter beneath the vessel, a gas supply that connects through a duct to the vessel for supplying pressurized gas into the vessel, and an outlet for extracted liquid at an outlet side of the filter, which is opposite to the vessel, wherein the outlet connects to an outlet duct for the extracted liquid.

Apart from the fact that the quality of the coffee of such a coffee dispenser system is top-of-the-line, one of the further advantages of this coffee dispenser system is that it is possible to brew large quantities of coffee without compromising the quality of the coffee. It is an object of the present invention to make full use of this advantageous property.

EP 3 298 934, U.S. Pat. Nos. 3,031,947 and 3,345,934 each disclose a coffee dispenser system comprising a coffee brewer unit, a container and a coffee supply channel between the coffee brewer unit and the container to provide a fluid connection between the coffee brewer unit and the container for receiving and holding coffee from the coffee brewer unit, and an outlet channel for coffee connected to the container.

According to EP 3 298 934 and U.S. Pat. No. 3,031,947 the coffee supply channel between the coffee brewer unit and the container, and the outlet channel for coffee both connect to the container at a bottom side of the container.

Discussion of the references and publication herein is given for more complete background and is not to be construed as an admission that such publications are prior art for patentability determination purposes.

The coffee dispenser system of the present invention is provided with the features of one or more of the appended claims.

BRIEF SUMMARY OF THE INVENTION

According to an embodiment of the present invention, a coffee supply channel that connects to the container extends upwardly inside the container up to a highest level. This highest level corresponds to the maximum level that the coffee can reach in the container. At said highest level an air relief chamber is provided to release the air from the coffee transported through the coffee supply channel, and from the air relief chamber a coffee mix channel extends downwardly to above and near to the bottom of the container. This arranges that the coffee enters the container, or when the container is not effectively used, can leave the container immediately through the outlet channel, with minimal heat loss. Furthermore, this construction with the coffee mix channel secures that the composition of the coffee maintains unchanged when entering into the container.

With the coffee dispenser system of the present invention, it is possible to fill from the container a full jug in one go, but also to absorb peaks in demand by repetitiously dosing cups of coffee from the container and at the same time replenish the container with the largest possible batches from the coffee brewer unit.

An example of a peak is for instance the coffee demand during a break in the performance in a theater, or the coffee demand during a breakfast buffet in a restaurant. When the coffee brewer unit is capable to supply batches of 480 cc coffee, 4 cups of 120 cc coffee can be continuously dosed in a period of time that is much shorter than when each cup of coffee is freshly and separately made at the very time it is required. With the coffee dispenser system of the invention the dosing times for coffee will be comparable with instant drinks. In addition, the advantage is attained that with these large batches, the first-cup temperature is no longer problematic as is the case in the prior art.

It is preferable that the container is provided with heat insulating properties to keep the coffee "fresh". It is for instance feasible that the container is embodied as a vacuum jacket. An (inverted) thermos bottle with screw connection to a bottom plate that closes off the thermos bottle is an 'easy to clean' and relatively inexpensive embodiment.

One notable advantage is that the container can be provided without heating facilities, which also supports keeping the coffee fresh.

The coffee supply channel and the outlet channel for coffee both connect to the container at a bottom side, notably at said bottom plate, of the container. This makes possible that the coffee dispenser system of the invention could also be used without the container being operational, so that freshly brewed coffee can go through the coffee supply channel and practically immediately flow into the outlet channel for coffee.

Suitably the container is provided with an air vent channel which determines a maximum possible level of coffee in the container.

It is beneficial that the dispenser system further comprises a sensor system for measuring a level of coffee in the container. This is particularly beneficial when the sensor system connects to a control system that drives the coffee brewer unit so as to maintain the level of coffee in the container between a predefined minimum and maximum level.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

Figure 1:
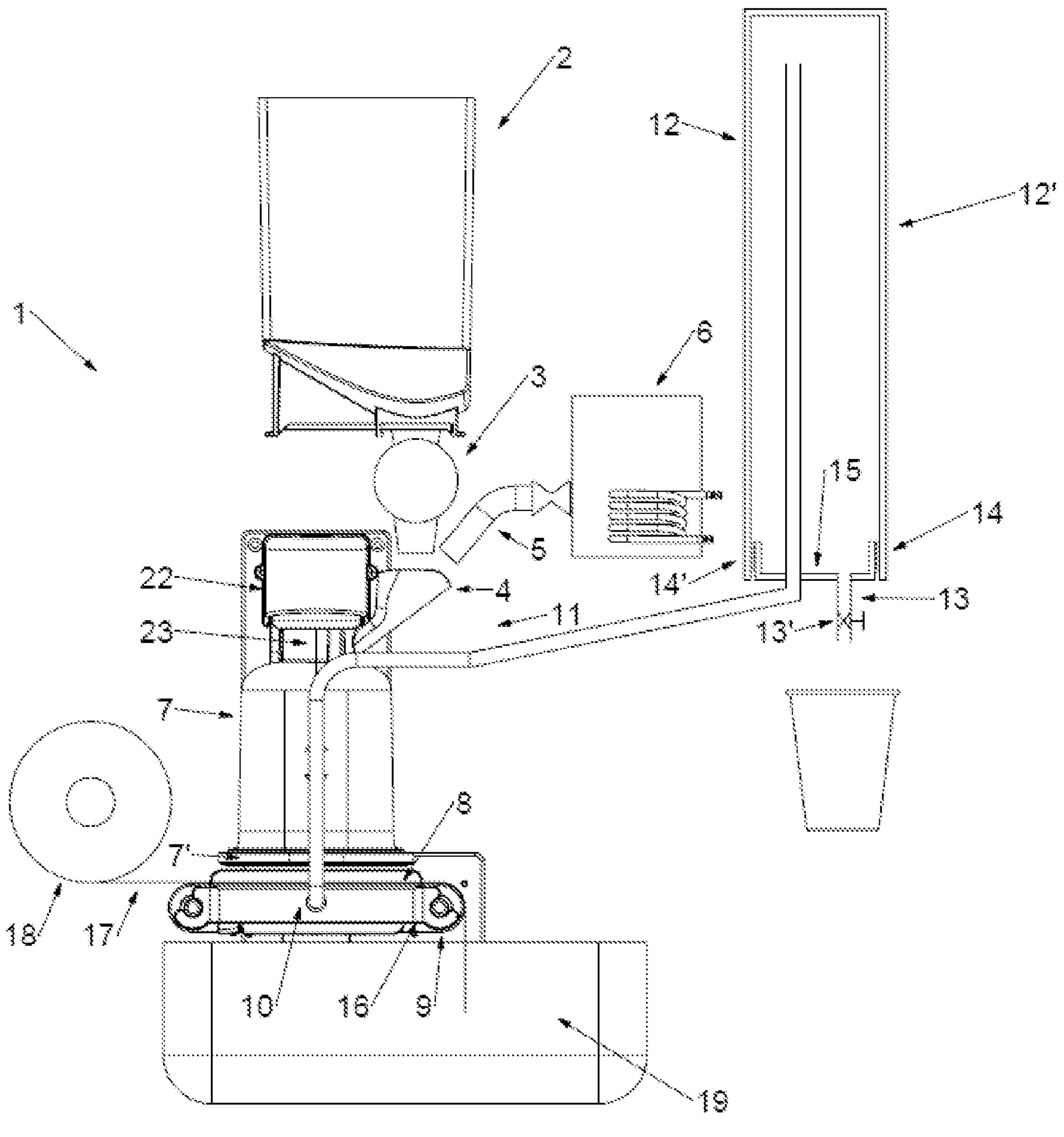
FIG. 1 is an illustration showing an example of a traditional coffee dispenser system which is provided for illustrative purposes.

Whenever in the figures the same reference numerals are applied, these numerals refer to the same parts.

In FIG. 1 a coffee dispenser system is shown comprising coffee brewer unit 1 with canister 2 for coffee beans. Below canister 2 is grinder 3 that provides grinded beans to chute 4.

Chute 4 also receives hot water from duct 5 that receives the hot water from heater 6 to which duct 5 is connected. The hot water ensures that the grinded beans from grinder 3 are transported and received in vessel 7 to which chute 4 connects. To accommodate one and another vessel 7 has a closable opening at location 23 at the upper side of vessel 7 for receiving both the powder material and the hot liquid. The closable opening is provided with a (not shown) valve at the height of arrow 23 for opening and closing of said opening, wherein the valve is arranged to provide an airtight closure of the opening of vessel 7 such that vessel 7 is enabled to be pressurized by the operation of a gas supply pump. The location and operation of the valve is known from the prior art document EP-A-0 546 498; it is therefore superfluous to further show this in the drawing.

In connection with the pressurization of vessel 7, it is preferred, although not necessary, that vessel 7 is up-and-down movable to enable that in the down position vessel 7 can engage filter 8 beneath vessel 7 and act on that filter 8 as a seal.

Figure 2:
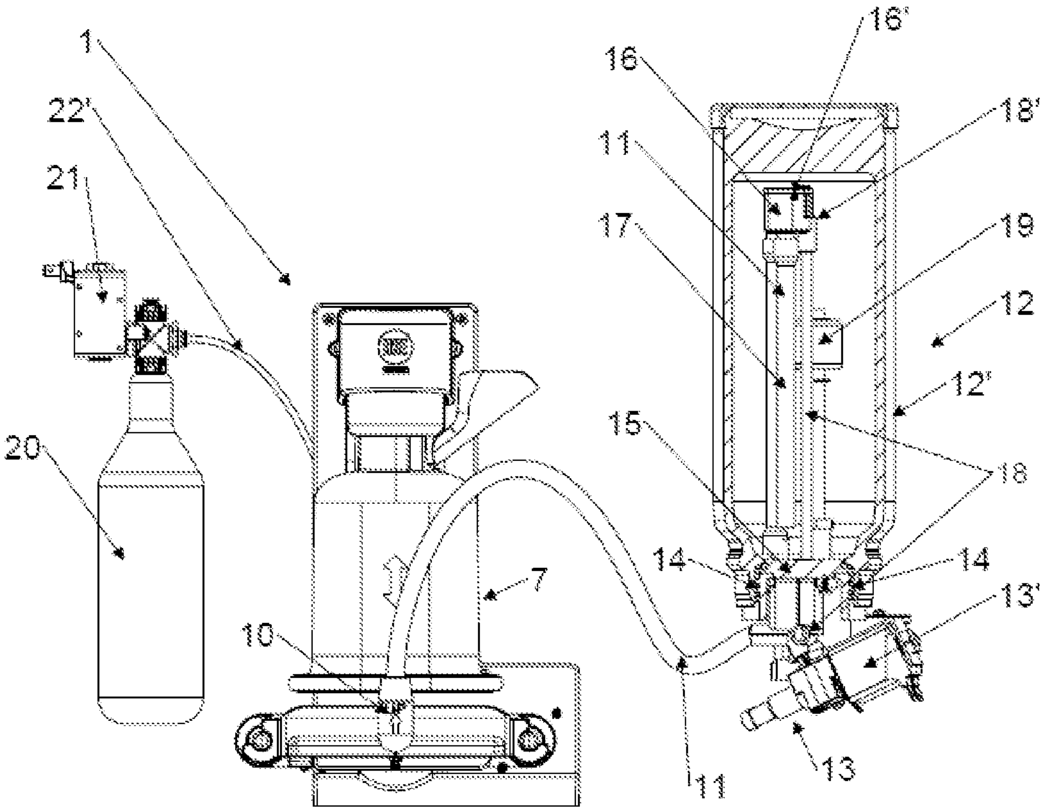
FIG. 2 shows an embodiment of a coffee dispenser system according to the present invention.

In FIG. 2 an exemplary embodiment of a coffee dispenser system of the invention is shown with coffee brewer unit 1, wherein emphasis is on inert gas container 20 which supplies inert gas through valve 21 and gas supply channel 22 for pressurization of vessel 7. Like in the coffee dispenser system of FIG. 1, also in the system of FIG. 2 it is preferred, although not necessary, that vessel 7 is up-and-down movable to enable that in the down position vessel 7 can engage filter 8 beneath the vessel 7 and act on that filter 8 as a seal.

In both systems of FIG. 1 and FIG. 2, coffee brewer unit 1 comprises outlet 10, which outlet 10 is intended for release of extracted liquid at an outlet side of filter 8 which is opposite to vessel 7. Said outlet 10 connects to coffee supply channel 11 for the extracted liquid. This coffee supply channel 11 connects coffee brewer unit 1 with container 12 to provide a fluid connection between coffee brewer unit 1 and container 12 that receives and holds coffee from coffee brewer unit 1. Further FIG. 1 and FIG. 2 show that container 12 is provided with outlet channel 13 with valve 13' for controlled release of coffee to be dispensed from container 12.

Preferably container 12 is provided with heat insulating properties. Preferably to that end container 12 is embodied as thermos bottle 12' provided with screw connection 14 for connecting to bottom plate 15 that closes off thermos bottle 12'. One favorable feature is that container 12 is provided without heating facilities.

Coffee supply channel 11 and outlet channel 13 for coffee both connect to container 12 at bottom side of the container 12, preferably to container's bottom plate 15.

With reference to FIG. 2 showing the construction of container 12 in accordance with an embodiment of the present invention, it is shown that coffee supply channel 11 that connects to the container extends upwardly inside container 12 up to a highest level. It is shown in this FIG. 2 that at said highest level air relief chamber 16 is provided to release air from the coffee transported through coffee supply channel 11. For this purpose, air relief chamber 16 is provided with air relief aperture 16'. Extending downwards from air relief chamber 16 is coffee mix channel 17 which extends to above and near to the bottom of container 12.

Further, FIG. 2 shows that container 12 is provided with air vent channel 18 which determines a maximum possible level 18' of coffee in container 12.

The dispenser system of the invention further preferably comprises sensor system 19 for measuring a level of coffee in container 12. Sensor system 19 connects to a control system (not shown) that drives coffee brewer unit 1 so as to maintain the level of coffee in container 12 between a predefined minimum and maximum level.

Although the invention has been discussed in the foregoing with reference to exemplary embodiments of the coffee dispenser system of the invention, the invention is not restricted to these particular embodiments which can be varied in many ways without departing from the invention. The discussed exemplary embodiments shall therefore not be used to construe the appended claims strictly in accordance therewith. On the contrary the embodiments are merely intended to explain the wording of the appended claims without intent to limit the claims. The scope of protection of the invention shall therefore be construed in accordance with the appended claims only, wherein a possible ambiguity in the wording of the claims shall be resolved using these exemplary embodiments.

Embodiments of the present invention can include every combination of features that are disclosed herein independently from each other. Although the invention has been described in detail with particular reference to the disclosed embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguration of their relationships with one another

What is claimed is:

1. A coffee dispenser system, comprising:

a coffee brewer unit;

a container;

a coffee supply channel disposed between the coffee brewer unit and the container to provide a fluid connection between the coffee brewer unit and the container for receiving and holding coffee from the coffee brewer unit; and an outlet channel for coffee which is connected to the container, wherein the coffee supply channel and the outlet channel for coffee both connect to the container at a bottom side of the container, wherein the coffee supply channel that connects to the container extends upwardly inside the container up to a highest level, wherein at said highest level a gas relief chamber is provided to release gas from the coffee transported through the coffee supply channel, and that from the gas relief chamber a coffee mix channel extends downwardly to above and near to the bottom of the container.

2. The coffee dispenser system of claim 1, wherein the container comprises heat insulating properties.

3. The coffee dispenser system of claim 1, wherein the container comprises a thermos bottle provided with a screw connection to a bottom plate that closes off the thermos bottle.

4. The coffee dispenser system of claim 1, wherein the container does not comprise heating facilities.

5. The coffee dispenser system of claim 1, wherein the container is provided with a gas vent channel which determines a maximum possible level of coffee in the container.

6. The coffee dispenser system of claim 1, wherein the dispenser system further comprises a sensor system for measuring a level of coffee in the container.

7. The coffee dispenser system of claim 6, wherein the sensor system connects to a control system that drives the coffee brewer unit so as to maintain the level of coffee in the container between a predefined minimum and maximum level.

* * * * *